(12) United States Patent
Osterday et al.

(10) Patent No.: US 7,182,183 B2
(45) Date of Patent: Feb. 27, 2007

(54) ELECTRICALLY ACTUATED DISC BRAKE ASSEMBLY

(75) Inventors: Craig A. Osterday, Dayton, OH (US); Michele M. Fiste, New Carlisle, OH (US); Garry J. Hill, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/796,227

(22) Filed: Mar. 9, 2004

(65) Prior Publication Data
US 2004/0168866 A1 Sep. 2, 2004

Related U.S. Application Data

(63) Continuation of application No. 10/202,771, filed on Jul. 24, 2002.

(51) Int. Cl.
*F16D 65/14* (2006.01)
(52) U.S. Cl. ............... 188/106 P; 188/71.5; 188/71.9; 188/72.8; 188/156
(58) Field of Classification Search ............. 188/71.5, 188/71.9, 72.7, 72.8, 156, 157, 162, 106 P
See application file for complete search history.

(56) References Cited

U.S. PATENT DOCUMENTS

| | | | |
|---|---|---|---|
| 3,612,619 A * | 10/1971 | Hayes ............... | 303/8 |
| 4,381,049 A | 4/1983 | Crossman | |
| 4,529,067 A * | 7/1985 | Scott ............... | 188/18 A |
| 4,542,809 A | 9/1985 | Crossman | |
| 4,567,967 A | 2/1986 | Crossman | |
| 4,784,244 A * | 11/1988 | Carre et al. ......... | 188/156 |
| 4,865,162 A | 9/1989 | Morris et al. | |
| 4,921,076 A | 5/1990 | Grenier et al. | |
| 4,995,483 A | 2/1991 | Moseley et al. | |
| 5,603,395 A | 2/1997 | Mabee | |
| 5,661,384 A | 8/1997 | Glibbery | |
| 5,706,918 A | 1/1998 | Redelman | |
| 6,003,640 A | 12/1999 | Ralea | |
| 6,251,441 B1 | 6/2001 | Van Den Braak et al. | |
| 6,282,971 B1 | 9/2001 | Shirai et al. | |
| 6,305,506 B1 | 10/2001 | Shirai et al. | |
| 6,325,180 B1 | 12/2001 | De Vries et al. | |
| 6,325,182 B1 | 12/2001 | Yamaguchi et al. | |
| 6,397,981 B1 * | 6/2002 | Tamasho et al. ........... | 188/71.9 |

(Continued)

FOREIGN PATENT DOCUMENTS

EP 1084949 A2 1/1988

(Continued)

Primary Examiner—Devon Kramer
(74) Attorney, Agent, or Firm—Scott A. McBain

(57) ABSTRACT

A disc brake assembly has a hub that is rotatable about an axis and at least a pair of discs supported on the hub for relative axial movement along the axis of the hub with the discs having opposite sides presenting braking surfaces. A non-rotatable support structure supports a plurality of friction elements for relative axial movement into and out of frictional braking engagement with the braking surfaces of the discs. An electric actuator is mounted on the support structure adjacent at least one of the friction elements and is operative when actuated to move the friction elements into frictional braking engagement with the braking surfaces of the discs.

12 Claims, 5 Drawing Sheets

U.S. PATENT DOCUMENTS

| | | |
|---|---|---|
| 6,402,259 B2 | 6/2002 | Corio et al. |
| 6,412,610 B1 * | 7/2002 | Drennen et al. ............ 188/156 |
| 6,412,613 B1 | 7/2002 | Lu |
| 6,457,783 B1 | 10/2002 | Schanzenbach et al. |
| 2002/0023806 A1 | 2/2002 | Ohtani et al. |
| 2002/0153772 A1 * | 10/2002 | Bunker ....................... 303/186 |
| 2004/0089505 A1 | 5/2004 | Audran et al. |
| 2005/0029858 A1 | 2/2005 | Forster et al. |

FOREIGN PATENT DOCUMENTS

| | | |
|---|---|---|
| FR | 2819469 | 7/2002 |
| JP | 03264725 | 11/1991 |
| WO | WO 03/016745 A2 | 2/2003 |

* cited by examiner

ELECTRICALLY ACTUATED DISC BRAKE ASSEMBLY

This application is a continuation of U.S. application Ser. No. 10/202,771, filed Jul. 24, 2002.

BACKGROUND OF THE INVENTION

1. Field of the Invention

The invention relates generally to disc brake assemblies having two or more brake discs axially slideable along a hub, and more particularly to the means for actuating sliding movement of such discs.

2. Related Art

Electrically actuated disc brake systems are known in which an electrical actuator is used to move brake pads into and out of engagement with a single disc that is fixed to a rotatable hub. Typically, electrical systems having a power source of 24 volts or greater would be used to achieve the force necessary to prevent relative rotational movement between a single disc brake assembly and a pair of opposing brake pads. In addition to requiring a substantial power source, an electric motor capable of exerting the necessary forces must be used. Therefore, in addition to the 24 volt or greater power source, a sizable electric motor is typically used to generate the braking forces required in a single fixed disc brake assembly. As such, electrically actuated brake systems have not been widely accepted due to the size and demands of an appropriate electric actuator.

Sliding disc-type brake systems are also known in which one or more brake discs are supported on a rotating hub and rotate with the hub as well as slide axially along the hub. Hydraulically actuated brake pads move into and out of engagement with the sliding disc(s) to effect selective braking action.

It is not believed to be known prior to this invention to utilize electric actuators to control the braking action of sliding disc-type brake systems.

SUMMARY OF THE INVENTION

A disc brake assembly constructed according to the present invention comprises a hub that is rotatable about an axis and on which at least a pair of brake discs are supported for rotation with the hub and for axial sliding movement relative to the hub along the axis. The discs have opposite sides presenting braking surfaces. A non-rotatable support structure supports a plurality of friction elements for relative axial movement into and out of frictional braking engagement with the braking surfaces of the discs. An electric actuator is mounted on the support structure adjacent at least one of the friction elements and is operative when actuated to move the friction elements into frictional braking engagement with the braking surfaces of the discs.

Since the sliding disc brake system of the invention employs multiple sliding brake discs, and thus presents a multiple of braking surfaces, the forces required by the electric actuator are half or less of the forces needed to actuate single fixed disc systems of the prior art. Consequently, a comparably smaller electric actuator can be used, lending to an overall reduction in the package size of the brake system. The smaller electric actuator also has a relatively lower voltage requirement, and as such draws less of the available electric power from the vehicle.

BRIEF DESCRIPTION OF THE DRAWINGS

These and other features and advantages of the present invention will become more readily appreciated when considered in connection with the following detailed description and appended drawings, wherein.

DETAILED DESCRIPTION OF A PREFERRED EMBODIMENT

Figure 1:
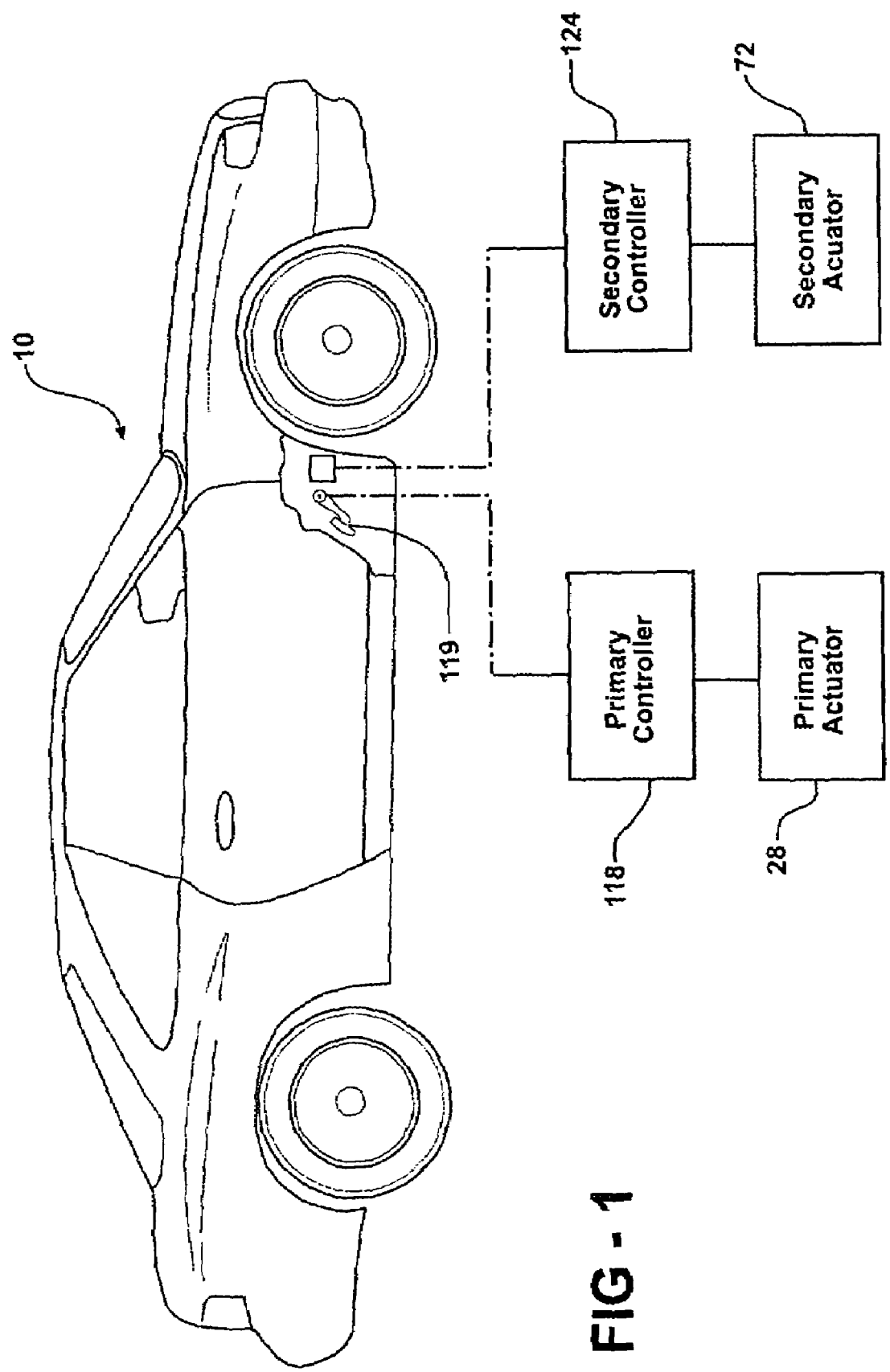
FIG. 1 shows a diagrammatic view of a vehicle having a sliding disc electrically actuated brake assembly according to a presently preferred embodiment of the invention.
Figure 2:
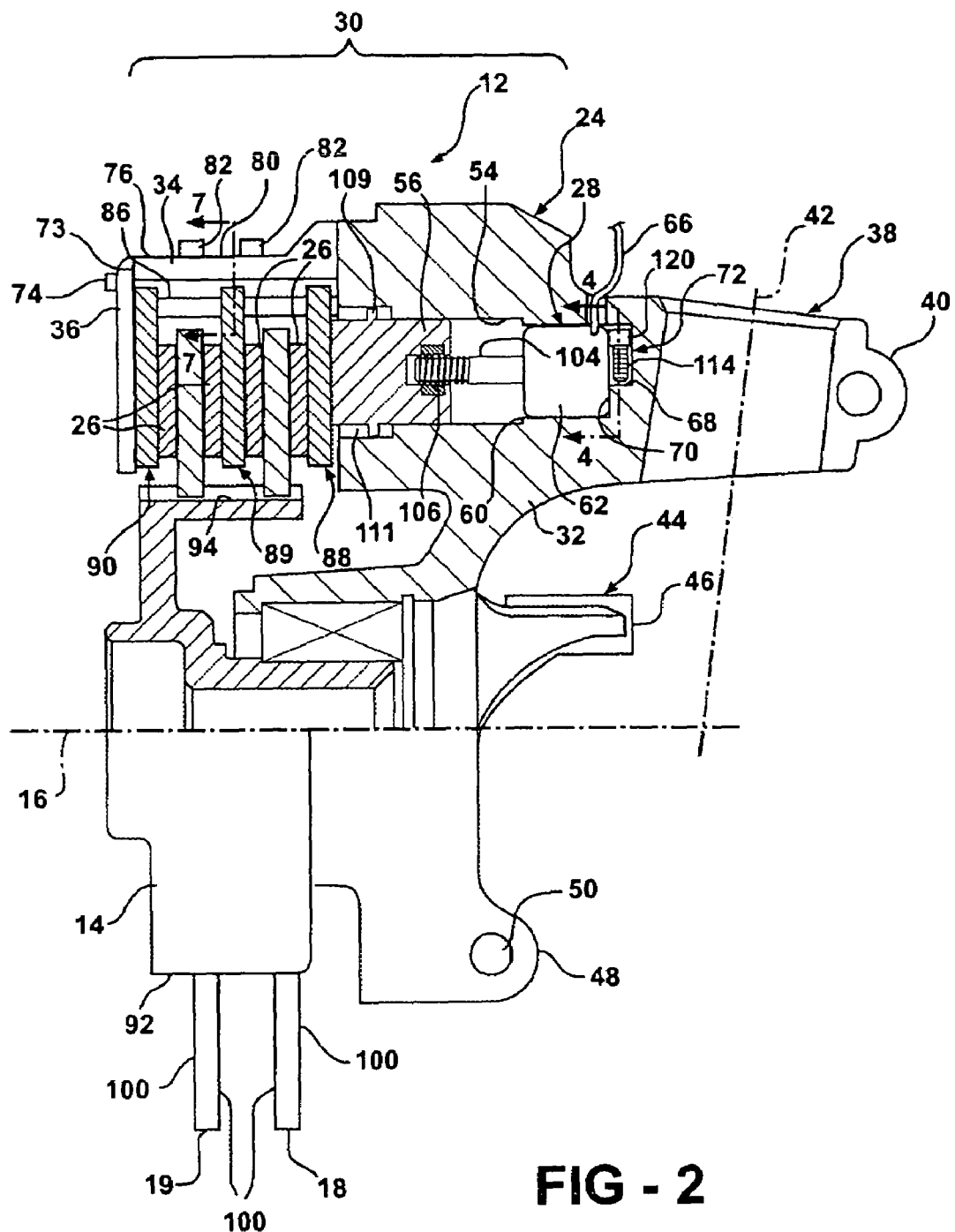
FIG. 2 is an enlarged fragmentary cross-sectional view of the disc brake assembly shown in an actuated position.
Figure 3:
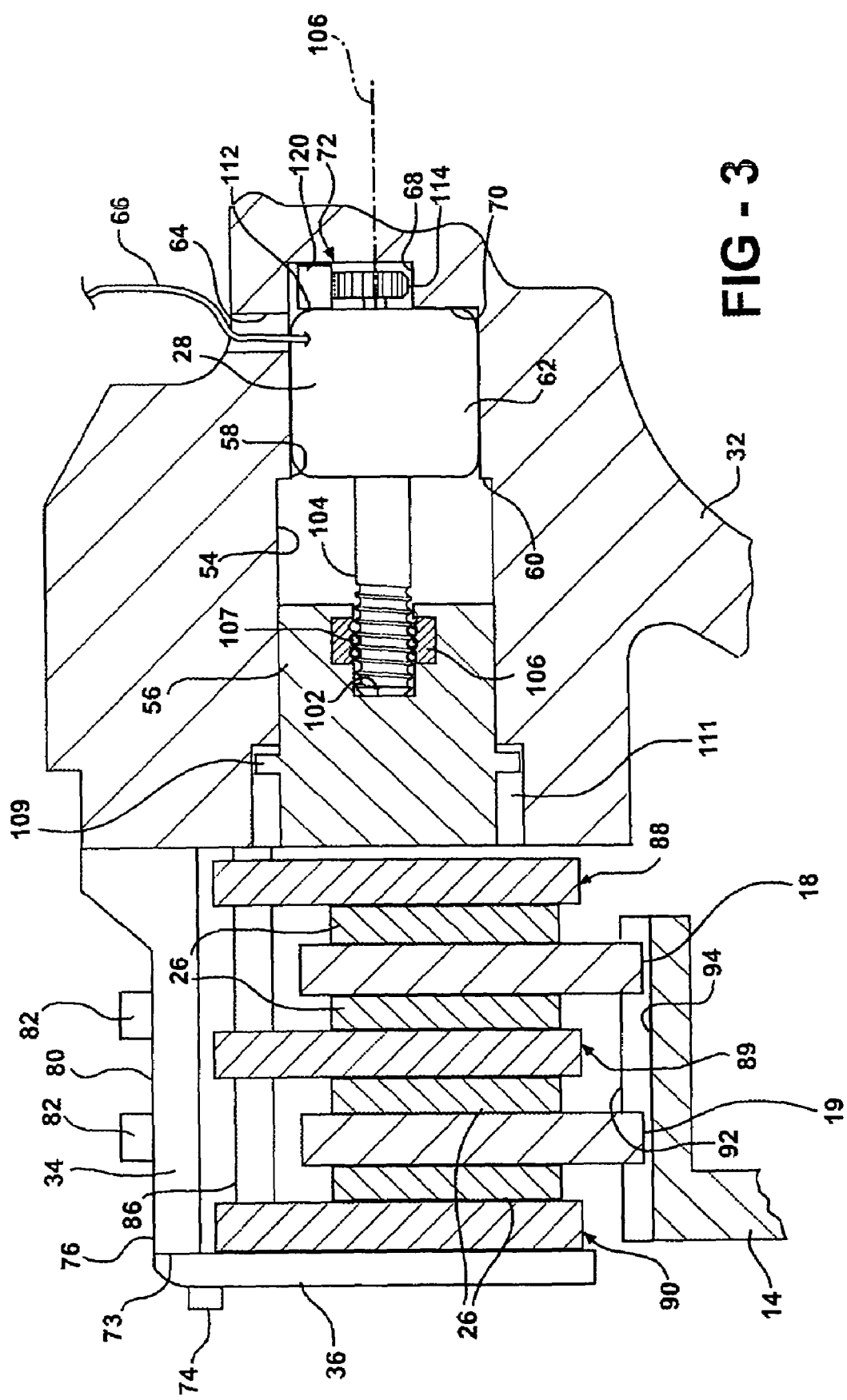
FIG. 3 is an enlarged fragmentary view like FIG. 2 but shown in an unactuated position.

FIG. 1 shows a vehicle 10 equipped with an electrically actuated disc brake assembly 12 constructed according to a presently preferred embodiment of the invention. Referring additionally to FIGS. 2 and 3, the disc brake assembly 12 has a hub 14 that is rotatable about an axis 16. The hub 14 supports at least a pair of discs 18, 19 for relative axial movement along the axis 16 and for conjoint rotation with the hub 14 about the axis 16. A nonrotatable support structure 24 supports a plurality of friction elements or brake pads 26 for relative axial movement into and out of frictional braking engagement with the discs 18, 19. A primary electric actuator 28 is mounted on the support structure 24 adjacent at least one of the friction elements 26 and is operative when actuated to move the friction elements 26 into and out of frictional braking engagement with the discs 18, 19.

The support structure 24 of the disc brake assembly 12 includes a support body 30 having a knuckle portion 32, a bridge portion 34, and an end plate portion 36. The knuckle portion 32 has an opening 38 formed in a mounting flange 40 of the knuckle portion 32 for receiving a strut (not shown). The opening 38 has an axis 42 about which the disc brake assembly 12 pivots on the strut. An opening 44 is formed in a lower section 46 of the knuckle portion 32 for receiving a pin of a ball joint on a tie bar (not shown). An arm section 48 extends laterally from the knuckle portion 32 and has an opening 50 for receiving a track bar (not shown) to enable the disc brake assembly 12 to rotate about the axis 42 in order to turn wheels of the vehicle 10.

A generally cylindrical piston bore 54 is formed in the knuckle portion 32 and receives a piston 56 for reciprocating movement therein. A motor chamber 58 is preferably formed and adjacent and preferably generally concentric to the piston chamber 54 and coextensive with a bottom surface 60 of the piston chamber 54. The motor chamber 58 receives a motor 62 which is coupled operatively to the piston 56 for reciprocating the piston 56 within the piston chamber 54. A port 64 extends into the motor chamber 58 and accommodates suitable wiring 66 for the motor 62. A counterbore 68 supports a secondary actuator 72 which operates to selectively move the piston 56 independently of the actuation of the primary actuator 28. Further details concerning the construction and operation of the actuators 28, 72 are described below.

Figure 7:
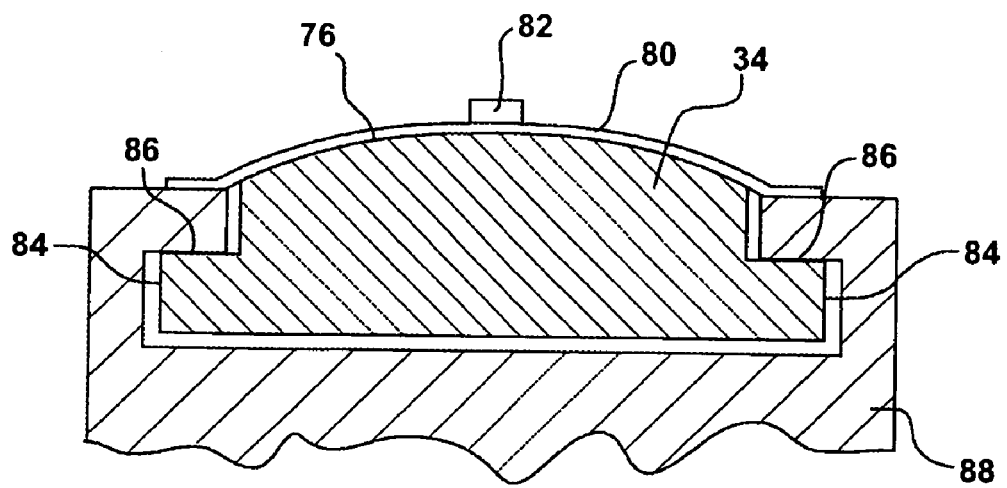
FIG. 7 is a fragmentary cross-sectional view taken generally along lines 7—7 of FIG. 2.

The bridge portion 34 of the disc brake assembly 12 has an end 73 spaced from the knuckle portion 32 and preferably a pair of threaded fastener openings to facilitate fastening the bridge portion 34 to the knuckle portion 32 by a pair of fasteners 74. A top surface 76 of the bridge portion 34 preferably has a pair of fastener openings enabling a spring device 80 to be fastened to the top surface 76 of the bridge portion 34 by a pair of fasteners 82. The bridge portion 34 has a pair of opposite sides 84 presenting a generally stepped slideway 86, as best shown in FIG. 7, along which a plurality of brake pad assemblies, shown here as an inner, intermediate, and outer brake pad assembly 88, 89, 90, respectively, slide axially. It should be recognized that the slideway can be formed in a variety of shapes and contours, and that the slideway need not have a generally stepped contour as shown here.

The brake pad assemblies 88, 89, 90, have the friction elements or brake pads 26 fixed thereto and are slidably supported by the slideway 86 of the bridge portion 34 for relative axial movement along the bridge portion 34. When the primary actuator 28 is actuated, the brake pads 26 slide into frictional engagement with the discs 18, 19, as best shown in FIG. 2, and when unactuated, slide out of frictional engagement with the discs 18, 19, as best shown in FIG. 3. The spring device 80 fastened to the top surface 76 of the bridge portion 34 exerts a force on the brake pad assemblies 88, 89, 90 to prevent them from rattling on the bridge portion 34.

The hub 14 is generally cylindrical and has an outer surface 92 with a plurality of axial slots or grooves 94 preferably extending the length of outer surface 92. The hub 14 is rotatably supported by the knuckle portion 32 for relative rotation thereto.

Figure 6:
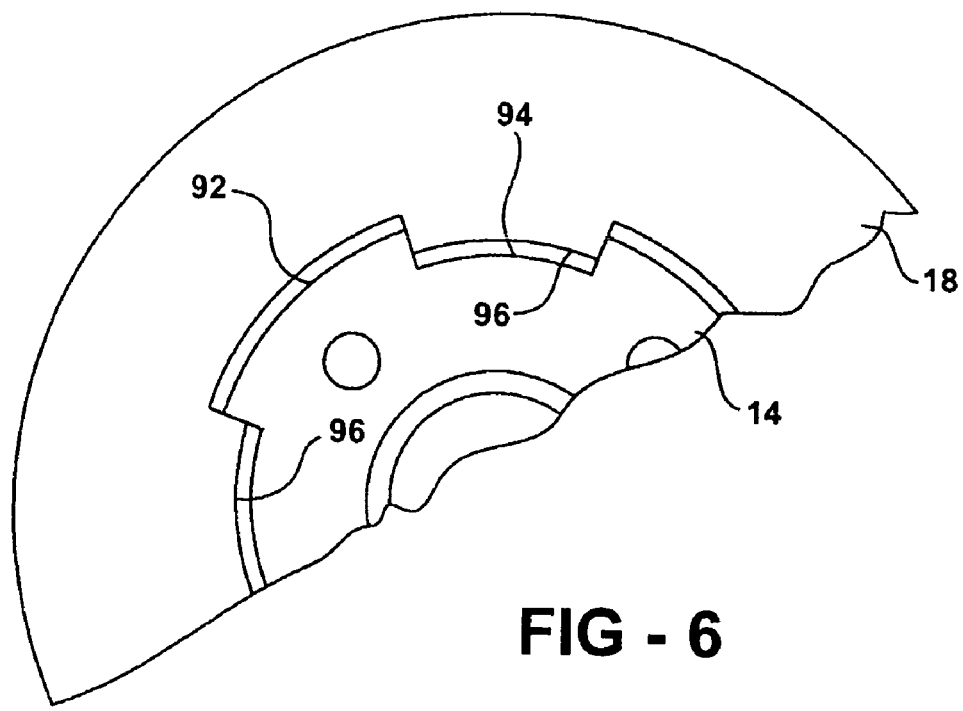
FIG. 6 is a fragmentary elevation view showing features of the discs and hub.

The discs 18, 19 preferably have inwardly extending ears or projections 96 that are slideably received within the grooves 94 in the hub 14, as best shown in FIG. 6, for relative axial movement along at least a portion the length of the hub 14. The discs 18, 19 are received between the brake pads 26 and have opposite sides presenting respective braking surfaces 100 which are selectively engaged by the brake pads 26. While the projections 96 of the discs 18, 19 allow the discs to slide freely axially within the grooves 94 of the hub, the projections 96 engage the hub 14 in a circumferential direction and provide for conjoint rotation of the discs 18, 19 with the hub 14. In other words, the projections, in effect, provide a splined connection between the discs 18, 19 and hub 14, enabling the discs 18, 19 to slide axially along the hub 14, while supporting the discs 18, 19 against relative rotation on the hub 14, so that the discs 18, 19 rotate with the hub 14.

The electric motor 62 drives a ball-screw type device of the general type shown in U.S. Pat. No. 6,282,971 B1 to Shirai et al. which is incorporated herein in its entirety. As well known in the ball-screw art, the ball-screw has a rotatable screw portion 104 and a nut portion 106. The screw portion 104 is driven by the motor 62 and extends into a bore 102 of the piston 56. The nut 106 is fixed within the bore 102 and carries a plurality of recyclable balls 107 which cooperate with helical ball grooves of the screw 104 to effect axial movement of the nut 106, and thus the piston 56 along the screw 104 in response to rotating the screw 104 in one direction or the other. The piston 56 has retainers 109 that extend into axial guides 111 of the knuckle portion 32 to support the piston 56 against rotation in the piston bore 54 during rotation of the screw 104. FIG. 2 shows the piston 56 in an extended, actuated position, in which the piston 56 is moved outwardly into contact with the brake pad 88, sliding it and brake pad 89 along with the discs 18, 19 axially outwardly and into stacked, frictional contact with one another against the fixed end pad 90 mounted on the bridge 34. Reversing the drive of the screw 104 via the electric motor 62 drives the nut 106 back in the opposite direction, causing the piston 56 to move to the retracted, non-actuated position shown in FIG. 3.

A shaft of the motor 62 forms the screw portion 104, and preferably extends through the electric motor 62 so that an end 110 of the screw portion 104 extends beyond an end 112 of the electric motor 62. A drive mechanism, shown here as a driven gear 114, is preferably attached adjacent the end 110 of the screw portion 104 for engagement and disengagement with the secondary actuator 72. The driven gear 114 is shown here as a spur gear, though it should be recognized that the driven gear 114 can be any type of toothed gear to facilitate operable connection to the secondary actuator 72. The electric motor 62 of the primary actuator 28 is connected to the vehicle via a primary controller 118 so that when a user actuates the primary actuator 28, preferably by a brake pedal 119, a signal is sent to the primary controller 118 and then to the electric motor 62 to actuate the primary actuator 28, thus bringing the brake pads 26 into frictional engagement with the discs 18, 19. Preferably, the electric motor is powered by a 12 volt or less power source, as is commonly provided as a power source in automobiles.

Figure 4:
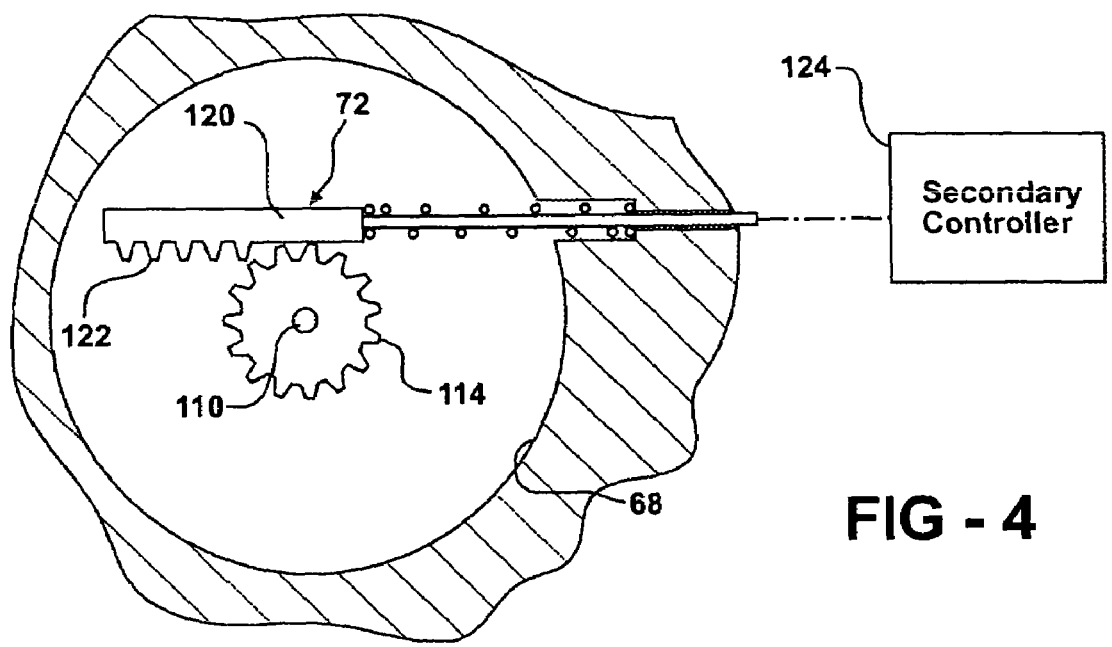
FIG. 4 is a fragmentary cross-sectional view taken generally along lines 4—4 of FIG. 2 showing the secondary actuator in the unactuated position.
Figure 5:
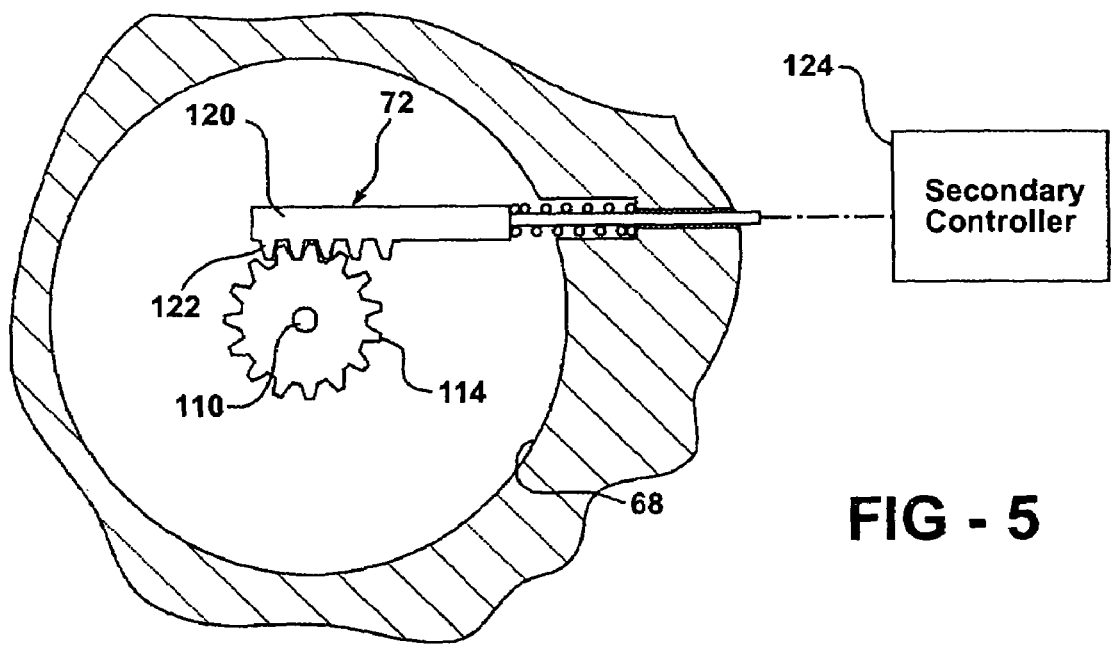
FIG. 5 is a view like FIG. 4 but shown in the actuated position.

Preferably, the secondary actuator 72 is coupled operatively to the piston 56 by way of a secondary controller 124, as shown in FIGS. 1, 4 and 5, and can either be electrically or mechanically actuated independently from the electric motor 62. The secondary actuator 72 is operative when actuated to move the piston 56 toward the inner brake pad assembly 88 and to move the brake pads 26 into frictional engagement with the discs 18, 19 independent of the primary actuator 28. The secondary actuator 72 has a drive mechanism shown here as a drive gear 120, represented as a rack style gear, having teeth 122 to engage and disengage the spur gear 114. While in an unactuated position, as best shown in FIG. 4, the teeth 122 on the drive gear 120 remain in a disengaged position from the spur gear 114, thus allowing the screw portion 104 and driven gear 114 to rotate freely relative to the drive gear 120. However, as shown FIG. 5, when the secondary actuator 72 is actuated, the teeth 122 on the drive gear 120 engage the driven gear 114 in a linear fashion. The linear movement of the rack 120 while engaged with the spur gear 114 causes the screw portion 104 to rotate, thus causing the piston 56 to reciprocate within the piston chamber 54 to facilitate movement of the brake pads 26 into and out of frictional engagement with the discs 18, 19. It should be recognized that though the secondary actuator 72 is shown as a rack and spur gear arrangement, any other suitable mechanical or electrical operative connection between the screw and the secondary actuator could be used. The secondary actuator 72 can be used as an emergency brake, overriding the operation of the primary actuator 28.

Obviously, many modifications and variations of the present invention are possible in light of the above teaching. It is, therefore, to be understood that within the scope of the appending claims, the invention may be practiced otherwise than as specifically described. The invention is defined by the claims.

What is claimed is:

1. A disc brake assembly for an automotive vehicle, comprising:
   a hub rotatable about an axis;
   at least a pair of circumferentially extending brake discs supported on said hub for rotation therewith and for axial sliding movement relative to said hub along said axis and extending radially outwardly of said hub and having opposite sides presenting braking surfaces;
   a non-rotatable support structure;
   a plurality of non-rotatable brake pads having spaced ends in the circumferential direction of said brake discs braking surfaces supported by said non-rotatable support structure for relative axial movement into and out of frictional braking engagement with said braking surfaces;
   a piston moveable from an unactuated position to an actuated position into engagement with an adjacent one of said non-rotatable brake pads to effect said sliding movement of said plurality of brake pads and said brake discs;
   a primary electric actuator mounted on said non-rotatable support structure adjacent at least one of said plurality of brake pads and operative when actuated to move said piston to an actuated position and to slide said plurality of brake pads and said brake discs into said frictional braking engagement with one another; and
   a secondary actuator coupled operatively to said piston and operative when actuated to move said piston to said actuated position independent of said actuation of said primary electric actuator.

2. The disc brake assembly of claim 1 wherein said primary electric actuator includes an electric motor.

3. The disc brake assembly of claim 2 wherein said electric motor operates on 12 volts or less.

4. The disc brake assembly of claim 1 wherein said piston has a bore and said primary electric actuator comprises a screw portion rotatable about an axis when said primary electric actuator is actuated, said screw portion received at least in part in said bore of said piston operatively connecting said screw portion to said piston to effect said movement of said piston.

5. The disc brake assembly of claim 1 wherein said secondary actuator is mechanically actuated to move said piston between said actuated and unactuated positions.

6. The disc brake assembly of claim 1 wherein said secondary actuator includes an electric motor.

7. The disc brake assembly of claim 1 wherein said secondary actuator includes a drive mechanism moveable between engaged and disengaged positions into and out of operative engagement with said piston.

8. The disc brake assembly of claim 7 wherein said drive mechanism includes a toothed rack.

9. The disc brake assembly of claim 8 wherein said drive mechanism includes a toothed gear engageable by said toothed rack.

10. A vehicle having a disc brake assembly, comprising:
    a brake pedal;
    a controller operatively connected to said brake pedal;
    a hub rotatable about an axis;
    at least a pair of brake discs supported on said hub for rotation therewith and for axial sliding movement relative to said hub along said axis and having opposite sides presenting braking surfaces;
    a non-rotatable support structure;
    a plurality of friction elements supported by said non-rotatable support structure for relative axial movement into and out of frictional braking engagement with said braking surfaces;
    a piston moveable from an unactuated position to an actuated position to effect said sliding movement of said plurality of friction elements and said brake discs;
    a primary electric actuator mounted on said non-rotatable support structure adjacent at least one of said plurality of friction elements and operative when actuated to move said piston to an actuated position and to slide said plurality of friction elements and said brake discs into said frictional braking engagement with one another; and
    a secondary actuator coupled operatively to said piston and operative when actuated to move said piston to said actuated position independent of said actuation of said primary electric actuator.

11. The disc brake assembly of claim 10 wherein said primary electric actuator includes an electric motor.

12. The disc brake assembly of claim 10 wherein said secondary actuator includes a drive mechanism movable between engaged and disengaged positions into and out of operative engagement with said piston.

* * * * *